United States Patent [19]
Baig et al.

[11] Patent Number: 5,355,992
[45] Date of Patent: Oct. 18, 1994

[54] BELT CLEANING APPARATUS

[75] Inventors: Nazoor A. Baig, Grosse Ile; Allen T. Dean, Ida; Anthony E. Krolikowski, Royal Oak; David W. Skiver, Petersburg, all of Mich.

[73] Assignee: Utility Technical Services, Inc., Detroit, Mich.

[21] Appl. No.: 136,164

[22] Filed: Oct. 15, 1993

[51] Int. Cl.⁵ .............................. B65G 45/22
[52] U.S. Cl. ...................... 198/495; 198/497
[58] Field of Search ............ 198/495, 497, 499

[56] References Cited

U.S. PATENT DOCUMENTS

| | | | |
|---|---|---|---|
| 1,793,246 | 2/1931 | Philips | 198/495 |
| 2,216,304 | 10/1940 | Thornton | 198/495 |
| 2,855,094 | 10/1958 | Zebarth | 198/495 |
| 3,865,232 | 2/1975 | Koenig et al. | 198/497 |
| 4,944,386 | 7/1990 | Swinderman | 198/499 |
| 5,031,750 | 7/1991 | Barnes | 198/495 |

FOREIGN PATENT DOCUMENTS

| | | | |
|---|---|---|---|
| 0914432 | 3/1982 | U.S.S.R. | 198/495 |
| 1022899 | 6/1983 | U.S.S.R. | 198/495 |
| 1055706 | 11/1983 | U.S.S.R. | 198/495 |

OTHER PUBLICATIONS

Martin Spray Wash Conveyor Belt Cleaning System, Martin Engineering Company, Form #3226–291WP.
Conveyor Belt Cleaners, Conveyor Components Company, Bulletin No. C-235.
Improved Spillage Control in Coal Handling Facilities Through Water Washing Systems, Bulk Solids Handling, vol. 12, No. 3, pp. 373–378 (Sep. 1992).

*Primary Examiner*—James R. Bidwell
*Attorney, Agent, or Firm*—Barnes, Kisselle, Raisch, Choate, Whittemore & Hulbert

[57] ABSTRACT

Apparatus for cleaning particulate material including coal particles and dust from a flexible belt of the type which is adapted to transport material such as coal on its material-supporting surface and which is of a composition which has and is subject to the development of surface cracks. The belt is advanced lengthwise along a predetermined path on its return run with the material-supporting surface on the underside. A scraper blade is supported crosswise of the belt in scraping contact with the material-supporting surface of the belt as the belt is advanced. Liquid is sprayed against the material-supporting surface of the belt and into the surface cracks adjacent to the point of contact of the scraping edge. The liquid is sprayed against a surface of the blade to be deflected into the cracks and also to maintain the blade in a clean condition. A backing member holds the belt down in contact with the scraper blade.

20 Claims, 2 Drawing Sheets

BELT CLEANING APPARATUS

This invention relates generally to belt cleaning apparatus and refers more particularly to apparatus for removing particulate material including dust that has become embedded in a belt of the type used to transport bulk materials such as coal.

BACKGROUND AND SUMMARY

Environmental guidelines often require effective belt cleaning apparatus. Even apart from the need to meet these environmental requirements, maintaining a clean plant has many operational, maintenance and health advantages.

When coal is moved on a conveyor belt, a layer of surface embedded particulate material often will build up on the belt surface. Such material includes particles of coal and coal dust, and may be in discrete particle form or the particles may be packed tightly together. Coal dust will get trapped in the irregular surfaces of the belt. Belts used in the transport of coal and like bulk material are usually made of reinforced rubber or rubber-like material which has cracks and dust gets into and lodges in these cracks.

The apparatus of the present invention is designed to remove both surface embedded particulate material from a transport belt for coal and the like, and also to remove dust from the belt cracks. These materials, particularly dust in the belt cracks, unless removed, will eventually become airborne due to the bouncing movement of the belt and its flexing as it passes over rollers and around pulleys. Belt cleaning apparatus has in the past been designed to remove carry back, but we are not aware of any completely successful attempt at removing the particulate material that accumulates in the cracks.

In accordance with the embodiment of the invention about to be described, water and a scraper blade combine to remove embedded particulate material including dust from the belt surface and from the cracks in the belt. The scraper blade is supported with its scraping edge extending across the width of the belt in contact with the material-supporting surface of the belt as it advances. A spray of liquid, which may be ordinary water, is directed into the surface cracks adjacent to the point of contact with the scraper blade. The blade and liquid discharge cooperate in removing particulate material including dust from the cracks. The liquid penetrates the belt subsurface and the blade not only scrapes the surface of the belt but acts to squeeze the water or liquid and embedded particulate material from the belt.

Further in accordance with the specific embodiment to be described, the liquid is directed against a surface of the scraper blade, and is deflected into the cracks in the surface of the belt. The blade thus not only cooperates in the cleaning action, but the force of the liquid against the blade prevents build up and keeps the blade relatively clean at all times.

A second stream of liquid is sprayed against the belt surface upstream of the point of contact with the scraper blade, serving to remove much of the surface particulate material before reaching the point of the joint scraper/liquid action.

Preferably, a second identical washer/scraper arrangement is installed beyond the first washer/scraper arrangement.

Beyond the scraper blade, a roller may be provided to squeeze water and any residual dust out of the belt.

A V-plow shaped scraper is provided on the side of the belt opposite the load-supporting surface. Ahead of the V-plow, a liquid stream cleans the surface of the belt. The V-plow removes the liquid and accumulated material from the belt surface. This plow also serves as a backing member for the scrapers mounted below the belt, and insures that the belt is flat so that the entire belt width is scraped on both surfaces.

A drainage receptacle is preferably placed beneath the belt enclosing the washer/scraper units. This receptacle has a sloping bottom which is washed down by a continuous liquid stream, to facilitate the removal of the water and particulate material.

One objective of this invention is to provide apparatus for cleaning a transport belt for bulk materials such as coal which has some or all of the features referred to above. This apparatus greatly reduces the cost associated with maintaining a safe and healthful working environment as well as the cost of equipment repair and replacement.

Other objectives are to provide an apparatus for cleaning a coal belt or the like which is rugged and durable in operation, composed of a relatively few simple parts, and relatively easy to install and maintain.

Other objectives, features and advantages of the invention will become more apparent as the following description proceeds, especially when taken with the accompanying drawings.

BRIEF DESCRIPTION OF TEE DRAWINGS

DETAILED DESCRIPTION

Figure 2:
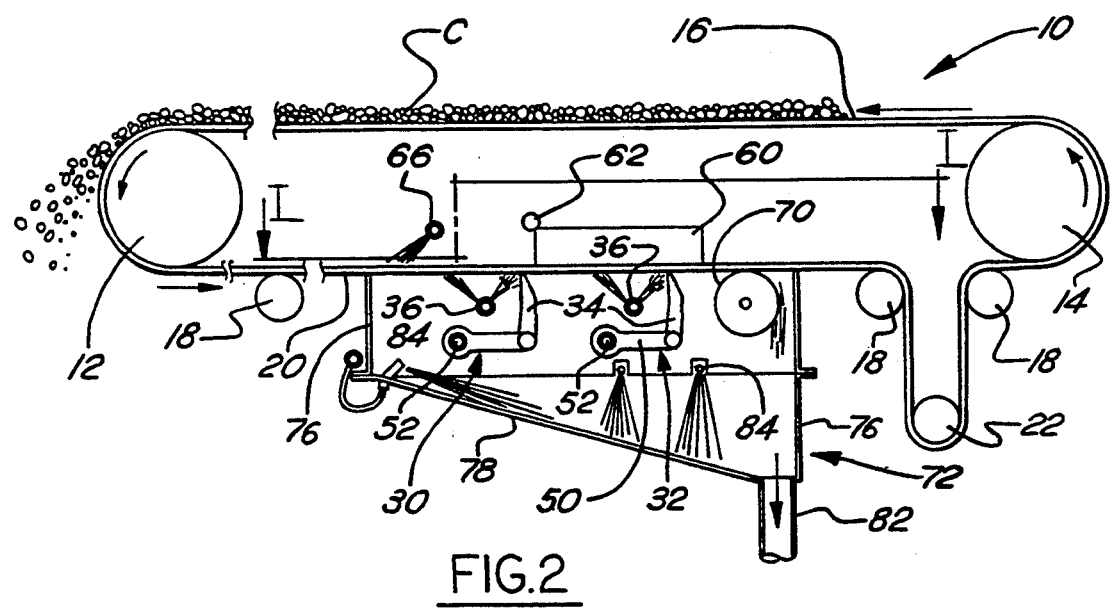
FIG. 2 is a semi-diagrammatic side elevational view of the apparatus.

Referring now more particularly to the drawings, an elongated endless flexible conveyor belt 10 is trained over two spaced apart rolls 12 and 14. These rolls are mounted on parallel axes and one is power driven to move the belt so that its horizontal top or loaded run 16 moves in the direction of the arrow. Bulk material, in this instance coal C, on the top loaded run of the belt is conveyed towards the left in. FIG. 2 and discharged over the roll 12. Idler rollers 18 support the horizontal bottom or return run 20, and roller 22 is adjustable vertically to take up slack.

Figure 4:
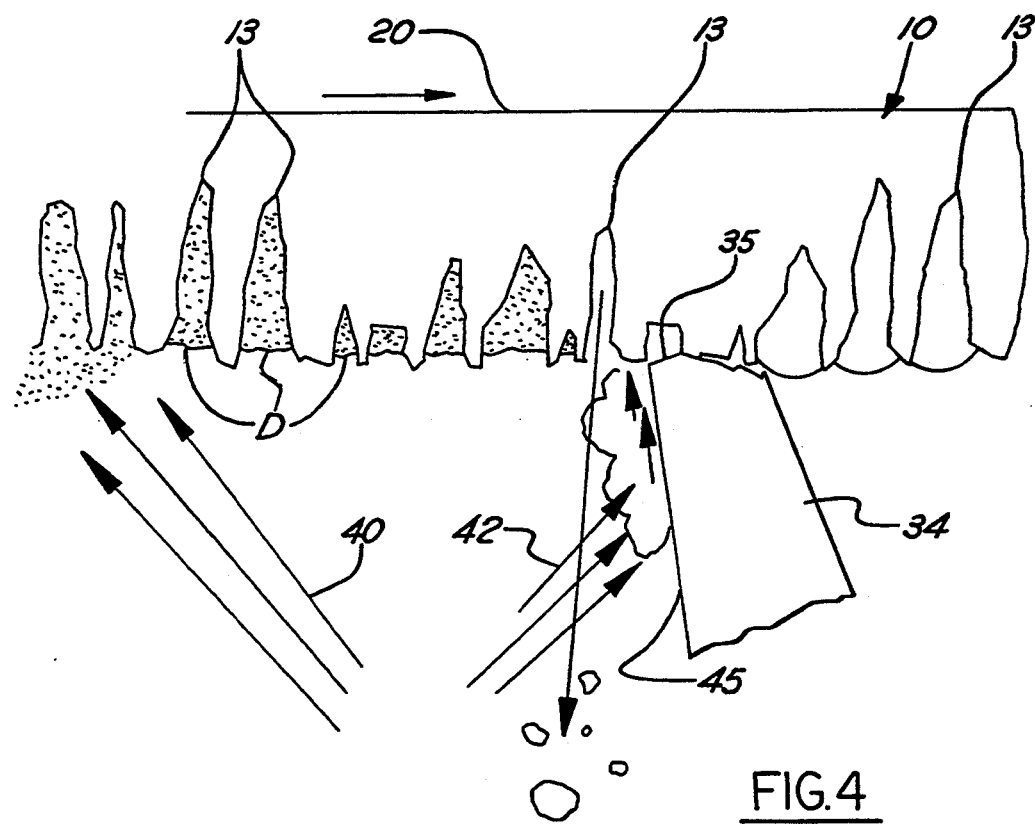
FIG. 4 is a further enlargement showing the engagement of the scraper blade with the conveyor belt and the deflection of the flow of liquid against the surface of the scraper blade and into the cracks of the conveyor belt.

The belt is preferably made of a reinforced flexible rubber or rubber-like material. Such material has surface cracks 13, shown enlarged in FIG. 4, and may develop additional cracks during use due to the weight of the material being transported and the constant flexing of the belt especially around the end rolls 12 and 14.

When transporting coal or like bulk material, particulate material including dust often will build up on the surface of the belt, and ultra-fine dust particles will work their way into the surface cracks. If not removed, these dust particles will eventually become airborne and contaminate the air.

The load side of the belt faces down on the return run 20 where the belt cleaning action takes place. Two substantially identical washer/scraper units 30 and 32 are provided in longitudinally spaced apart relation beneath the return run 20. Each unit has a scraper 34 and a liquid spray pipe 36. The spray liquid is usually ordinary water.

The scraper 34 is an elongated flat blade which extends perpendicular to the belt from one side to the other and is in a generally upright position. The top of the scraper blade has a narrow horizontal scraping edge 35 which is in continuous contact with the downwardly facing load side of the belt on the return run across substantially the full width thereof.

The spray pipe 36 is disposed slightly to the rear or upstream of the scraper blade and extends substantially parallel to the scraper blade and perpendicular to the belt. The scraper blade 34 is carried by arms 50, and although the connection is rigid, the scraper blade may be angularly adjusted to meet the needs of the apparatus in order to insure that the deflected water enters the cracks in the belt. The pipe is spaced beneath the belt and extends across the full width thereof. The pipe has a plurality of nozzles 37 spaced apart along its length. Some of the nozzles direct a fluid spray shown at 40 in a rearward direction against the belt at about a 45° angle to the horizontal. The remaining nozzles direct a spray indicated at 42 in a forward direction likewise at about a 45° angle to the horizontal. The spray in both directions extends across the full width of the belt so that the belt is completely washed across its full width with liquid discharged under pressure.

The nozzles which direct the forced spray in a forward direction as indicated at 42 direct the water against the surface 45 of the blade, cleaning the blade, which extends downward from its scraping edge. This surface of the blade is angled so that the water striking it from the water pipe is deflected upwardly substantially vertically so as to enter the cracks in the belt. This deflection forms a driving sheet or blade of water which enters the cracks and drives out the dust and any other particulate material D lodged and embedded therein.

The nozzles which direct the forced spray in a rearward direction as indicated at 40 are effective in removing surface material, thereby exposing the cracks to the action of the spray 42 and scraper blade 34.

A rotatable connection 36a allows the spray pipe 36 to be adjusted about its longitudinal axis to thereby adjust the angle of discharge of the liquid spray from nozzles 37.

Figure 1:
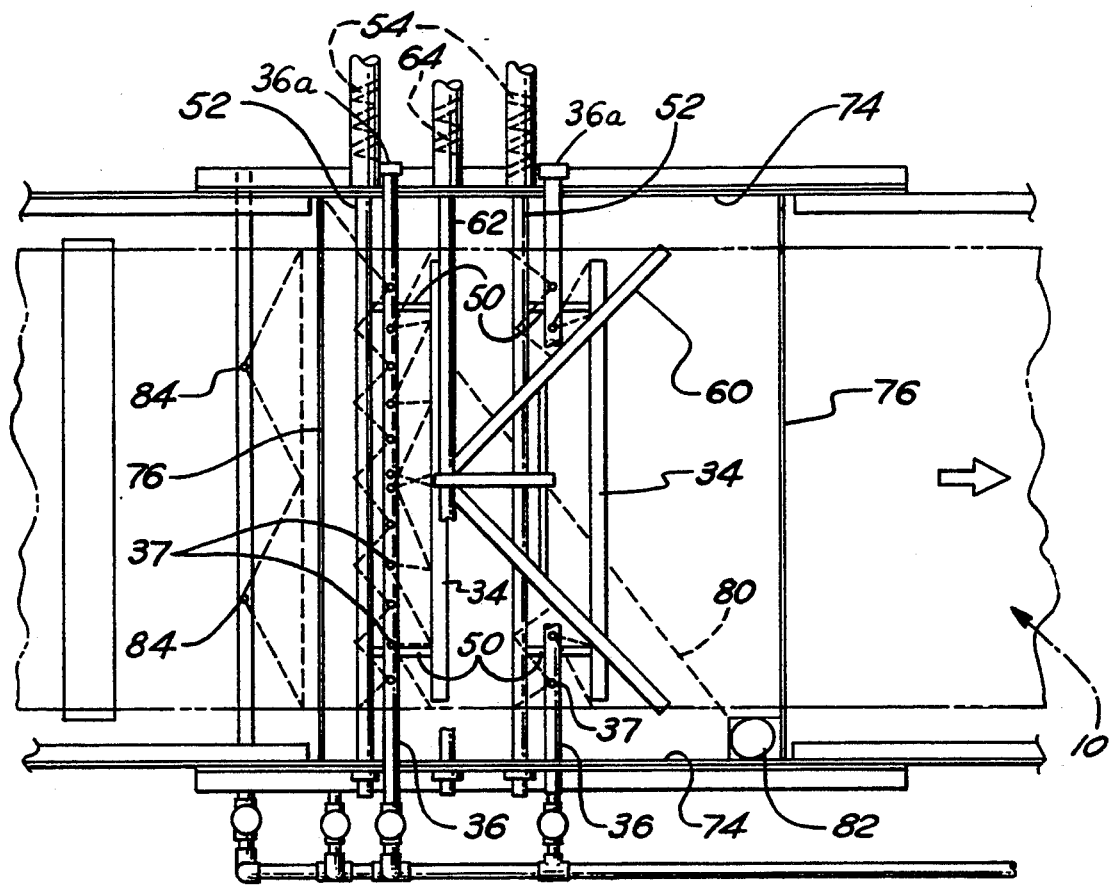
FIG. 1 is a fragmentary top view of apparatus constructed in accordance with the invention, taken on the line 1—1 in FIG. 2, in which parts are broken away for clarity and the conveyor belt appears in phantom lines.
Figure 3:
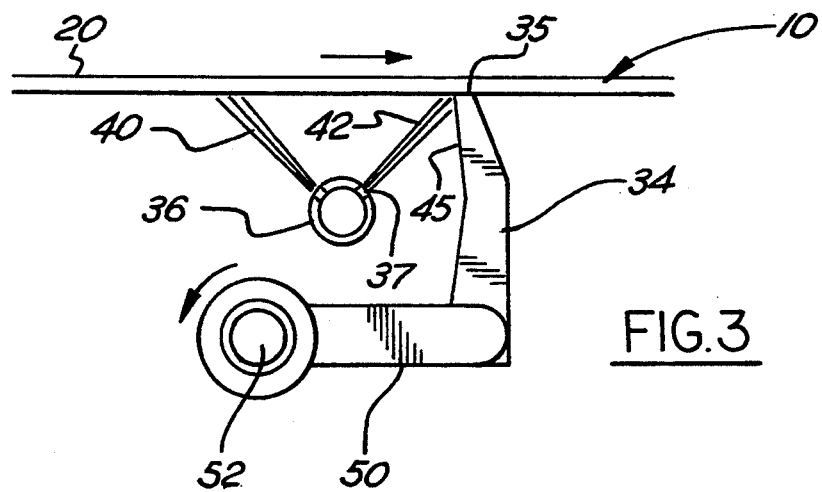
FIG. 3 is an enlargement of a portion of FIG. 2.

The arms 50 on which the scraper blade is mounted are carried by a shaft 52 supported for rotation beneath the belt and urged by a coil spring 54 in a counter-clockwise direction, as viewed in FIGS. 2 and 3, to press the scraper blade against the belt.

The scraper blades squeeze much of the water and dust out of the cracks in the belt as the belt passes, but a certain amount may remain. Downstream from the scraper blades, a transverse idler roll 70 presses upwardly against the belt to squeeze this remaining liquid and dust from the belt. A spray pipe 66 spaced above the return run 20 extends perpendicular to the belt and has nozzles directing a cleaning liquid such as water downwardly across the full width thereof in advance or ahead of the backing member 60.

The backing member or scraper 60 is V-shaped and plow-like and is disposed over the return run 20 to engage the side of the belt opposite its coal-supporting surface just above the point of contact of the scraping edges of blades 34. This backing member 60 extends across the full width of the belt. The backing member is carried by arms 62 mounted on a transverse shaft which is urged by a coil spring 64 in a clockwise direction, as viewed in FIG. 2, to press the belt down on the scraper blades. The plow or backing member insures that the belt is flat so that the entire width is scraped on both surfaces. This V-plow or backing member also serves as a scraper to remove surface material and water from spray pipe 66. In this embodiment, only a single backing member is employed because the two scraper blades are close together. If the two scraper blades were spaced further apart, a second backing member might be desirable, one above each blade.

A receptacle 72 is placed beneath the washer/scraper units 30 and 32 and the roll 70. This receptacle has side and end walls 74 and 76 and a bottom wall 78. The bottom wall has sloping bottom panels which meet along a line 80. The slope of the bottom wall panels is in two separate planes and is preferably greater than 10° to the horizontal to insure that the water and dust flushed out of the belt cracks will flow down to the drain or outlet 82 at the lowest point in the bottom wall. Additional water is sprayed on the bottom wall from spray nozzles 84 to thoroughly wash down the water and material flushed from the belt.

What is claimed is:

1. Apparatus for cleaning particulate material including dust from an elongated flexible belt of the type which is adapted to transport material such as coal on its material-supporting surface and which is of a composition which has surface cracks and collects such material in said cracks, comprising means for advancing said belt lengthwise along a predetermined path, a scraper blade having a scraping edge, means for supporting said scraper blade so that its scraping edge extends crosswise of the belt in scraping contact with the material-supporting surface of the belt as the belt is advanced, and means for directing liquid against the material-supporting surface of the belt and into the surface cracks adjacent to the point of contact of said scraping edge, said liquid-directing means comprising a liquid-deflecting surface of said scraper blade extending away from said scraping edge, and nozzle means for discharging said liquid against said liquid-deflecting surface to be deflected against the material-supporting surface of said belt as aforesaid.

2. Apparatus as defined in claim 1, wherein said liquid impinges on said material-supporting surface of said belt at substantially a right angle thereto.

3. Apparatus as defined in claim 1, including means downstream from said scraper blade for squeezing water and particulate material out of the belt.

4. Apparatus as defined in claim 1, and further comprising a backing member engaging the side of said belt opposite its material-supporting surface adjacent the point of contact of said scraping edge of said scraper blade therewith.

5. Apparatus as defined in claim 4, wherein said backing member is a V-shaped plow scraper.

6. Apparatus as defined in claim 5, and further including means for spraying liquid on said opposite surface of said belt in advance of said backing member.

7. Apparatus as defined in claim 1, and further including means for directing liquid against the material-supporting surface of the belt upstream of the point of contact of said scraping edge of said scraper blade therewith.

8. Apparatus as defined in claim 1, including means downstream from said scraper blade for squeezing water and particulate material out of the belt.

9. Apparatus as defined in claim 8, wherein said squeezing means comprises a roller.

10. Apparatus for cleaning particulate material including dust and dirt from an elongated flexible belt of the type which is adapted to transport material such as coal on its material-supporting surface and which is of a composition which has surface cracks, comprising means for advancing said belt lengthwise along a predetermined path on its return run with its material-supporting surface on the underside, a scraper blade having a scraping edge, means for supporting said scraper blade beneath said belt so that its scraping edge extends crosswise of the belt in scraping contact with the material-supporting surface of the belt as the belt is advanced, and means for directing liquid against the material-supporting surface of the belt and into the surface cracks adjacent the point of contact of said scraping edge, said liquid-directing means comprising a liquid-deflecting surface of said scraper blade extending away from said scraping edge, and nozzle means for discharging said liquid against said liquid-deflecting surface to be deflected against the material-supporting surface of said belt at substantially a right angle thereto and to keep the blade clean and prevent an accumulation of particulate material thereon.

11. Apparatus as defined in claim 10, and further including means for directing liquid against the material-supporting surface of the belt upstream of the point of contact of said scraping edge of said scraper blade therewith.

12. Apparatus as defined in claim 11, and further including a backing member engaging the side of said belt opposite its material-supporting surface adjacent the point of contact of said scraping edge of said scraper blade therewith.

13. Apparatus as defined in claim 12, and further comprising means for receiving liquid and drainage from said cleaning operation comprising a receptacle beneath said belt having a bottom wall provided with an outlet port, said bottom wall sloping downwardly toward said outlet port.

14. Apparatus as defined in claim 13, and further comprising means for directing a spray of liquid against said bottom wall to promote the flow of drainage toward said outlet port.

15. Apparatus as defined in claim 14, wherein said bottom wall slopes in two planes at angle to the horizontal of greater than 10°.

16. Apparatus as defined in claim 15, including means downstream from said scraper blade for squeezing water and any remaining material out of the belt.

17. Apparatus as defined in claim 16, wherein said squeezing means is a roller.

18. Apparatus as defined in claim 12, wherein said backing member is a V-shaped plow scraper.

19. Apparatus as defined in claim 18, and further including means for spraying liquid on said opposite surface of said belt in advance of said backing member.

20. Apparatus as defined in claim 12, wherein said nozzle means is adjustable to vary the angle of its discharge against said liquid deflecting surface.

* * * * *